May 27, 1958 C. S. FULLER 2,836,523

MANUFACTURE OF SEMICONDUCTIVE DEVICES

Filed Aug. 2, 1956

INVENTOR
C. S. FULLER
BY
Arthur J. Torsiglieri
ATTORNEY

United States Patent Office 2,836,523

Patented May 27, 1958

2,836,523

MANUFACTURE OF SEMICONDUCTIVE DEVICES

Calvin S. Fuller, Chatham, N. J., assignor to Bell Telephone Laboratories, Incorporated, New York, N. Y., a corporation of New York Application August 2, 1956, Serial No. 601,758

8 Claims. (Cl. 148—1.5)

This invention relates to semiconductor signal translating devices, and, more particularly, to the fabrication of such devices wherein the semiconductive body comprises two or more contiguous zones of opposite conductivity type.

Semiconductive bodies having two or more contiguous zones of opposite conductivity types and defining p-n junctions find application in a variety of signal translating devices; for example, in rectifiers and detectors such as are disclosed in United States Patent 2,602,211 granted July 8, 1952, to J. H. Scaff and H. C. Theuerer, and in transistors such as are disclosed in Patents 2,502,488, granted April 4, 1950, and 2,569,347, granted September 25, 1951, to W. Shockley.

One general object of this invention is to facilitate the production of p-n junctions in semiconductive bodies.

More specific objects of this invention are to produce semiconductive bodies for use in junction transistors, particularly the kind which involve either a hook collector or an intrinsic barrier adjacent the collector junction, to enable controlled formation of p-n junctions of prescribed configuration in semiconductive bodies, and to produce semiconductive bodies of p-n-p and n-p-n configuration, the thickness of whose intermediate layer is readily controllable.

In general, this invention relates to a method for forming rectifying junctions in a semiconductor which involves the use of gettering techniques for depleting a selected region of a body of a significant impurity to change the conductivity type of the selected region of the body. In particular instances, this significant impurity is one which had previously been added to the body to convert the conductivity type of the body. It will be convenient for the sake of brevity to describe as "significant" an impurity which is capable of determining the conductivity type.

Gettering techniques for improving the operating characteristics of semiconductive bodies having p-n junctions therein have been disclosed in my copending application Serial No. 321,603, filed November 20, 1952. In particular, this copending application discloses a method for improving the electrical characteristics of semiconductive bodies having one or more p-n junctions therein by applying an appropriate metal to one surface of such bodies and heating to some appropriate temperature whereby substantially complete removal from the interior of the body of particular undesired impurities occurs.

It will be convenient to describe the principles of the invention with specific reference to a process of manufacture in which there is first prepared a semiconductive body having therein an excess of a rapidly diffusing significant impurity over a more slowly diffusing significant impurity of opposite type. In accordance with the invention, at the surface of such a semiconductive body there is provided a sink in which the rapidly diffusing impurity is highly soluble at a given temperature. The body is then heated to such a temperature for a time to remove in a narrow region of the body adjacent the sink enough of the rapidly diffusing significant impurity by the gettering action of the sink, whereby there is effected a change in the conductivity type of the material in such region of the body adjacent the sink.

Various methods for preparing initially a semiconductive body having an excess of rapidly diffusing impurities may be used. For example, the slowly diffusing impurity and the rapidly diffusing impurity of opposite conductivity type may be added during the growing of the single crystal ingot from which there is cut the semiconductive body. Alternatively, it may sometimes prove more advantageous to include the slowly diffusing impurity in the formation of the single crystal ingot from which there is cut the semiconductive body, and then subsequently to diffuse therein the rapidly diffusing impurity.

The invention will be more fully understood from the following more detailed description, taken in conjunction with the accompanying drawings, in which.

In each of the figures, the dimensions shown are not to scale.

The principles of the invention are incorporated in the examples given below.

Figure 1A:
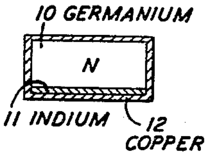
Figs. 1A through 1D show a semiconductive body at different stages in a process in accordance with the invention for providing a substantially planar rectifying junction in the body.
Figure 1B:
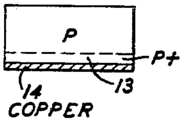

A germanium wafer typically 40 mils in thickness and 100 mils square is cut from an n-type antimony doped germanium single crystal of about 10 ohms centimeter specific resistivity. There is then plated on one surface of the body 10 a layer of indium 11 about .01 mil thick and then over the entire surface of the body a layer 12 of copper about 0.1 mil thick. The resultant is shown in Fig. 1A.

The body is thereafter heated for about 10 minutes at 850 degrees centigrade in an inert atmosphere and then cooled to room temperature. There results a body which is p-type throughout with a specific resistivity of about 0.2 ohm centimeter as a consequence of the copper diffused therethrough and further includes an indium alloy layer 13 at one surface which is more strongly p-type. The excess copper is removed by grinding from all surfaces of the body except layer 13 where there remains a thin copper film 14.

Figure 1C:
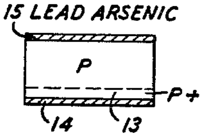

There is then positioned on the surface opposite the region 13 a layer 15 which is lead doped with approximately 0.1 to 1 percent of arsenic and is approximately 0.2 mil thick. The resultant is shown in Fig. 1C. The wafer is then heated rapidly to about 850 degrees centigrade by being pulled through a resistance wound furnace for approximately 30 seconds and quenched. The heating time is chosen such that depletion of copper takes place from the portion of the germanium body adjacent the layer 15 but not at the portion adjacent the layer 13. The heating temperature is chosen to be below the melting point of germanium and above the melting point of lead where the copper diffuses readily and is much more soluble in the molten lead than in the germanium body.

Figure 1D:
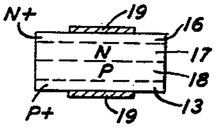

The resulting germanium body, shown in Fig. 1D, has an $n^+$-type region 16 heavily doped with arsenic, an n-type region 17 formed by the depletion of a sufficient quantity of copper to render the antimony impurity in predominance, a p-type region 18 where copper is predominant, and $p^+$-type region 13 which is heavily doped with indium. Electrodes 19 are attached to regions 13 and 16 by any technique known in the art. The semiconductive diode having therein a p-n junction so produced is suitable for use as a rectifier.

The layers may be controlled in thickness by proper control of operating conditions to obtain conductivity modulation of the high resistance portion of the wafer as is discussed in greater detail in copending application Serial No. 431,867, filed May 24, 1954, by M. B. Prince.

Figure 2A:
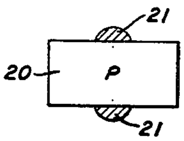
Figs. 2A and 2B show a semiconductive body at different stages in a process in accordance with the invention for providing an n-p-n type semiconductive body wherein the p-n junctions are cup-shaped.

Fig. 2A shows a germanium body typically 40 mils thick and 100 mils square which is of p-type and which may be prepared in the manner previously described for producing a p-type germanium body having an excess of copper acceptors over antimony donors. Two globules of a suitable gettering metal 21, such as gold, each weighing approximately 0.2 milligram and doped with 0.1 to 1 percent by weight of antimony are placed on opposite faces of p-type body 20. To keep the gold globules in place, one globule is placed on an upper surface of the wafer and alloyed to the wafer at about 370 degrees centigrade. The wafer is then turned so that the surface with the alloyed globule attached is facing down. The other globule is then attached to the surface facing up in the same manner as described.

Figure 2B:
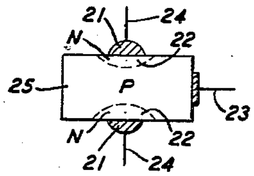

The germanium body shown in Fig. 2A is then pulled through a resistance wound furnace with a tungsten wire to heat the body at about 900 degrees centigrade for approximately 20 seconds. Two cup-shaped n-type regions 22 are formed by depletion of the rapidly diffusing copper atoms therefrom resulting in an n-p-n type germanium body shown in Fig. 2B. Electrodes 24 are attached in n-regions 22 and electrode 23 is attached to the p-type remainder of the body 25 by techniques known in the art. The p-type remainder of the body 25 remains p-type because the heating time has been made sufficiently short that depletion of excess copper atoms does not take place except in the vicinity of the gold globules 21.

Figure 3A:
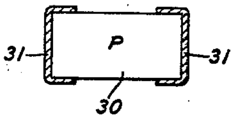
Figs. 3A and 3B show a semiconductive body at different stages in the formation of an n-p-n type semiconductive body having substantially planar p-n junctions therein.
Figure 3B:
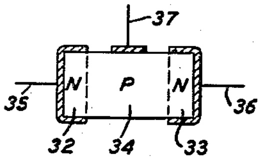

Figs. 3A and 3B show a germanium body in different stages of a method in accordance with applicant's invention for forming an n-p-n type germanium body having substantially planar junctions. A p-type germanium body 30, typically 40 mils thick and 100 mils square and which may be prepared in the manner described above for producing a p-type germanium body having an excess of copper atoms over antimony atoms, is coated at terminal portions with a layer of silver 31 typically 0.1 mil in thickness, and doped with 0.1 to 1 percent by weight of antimony.

The germanium body shown in Fig. 3A is then heated at approximately 850 degrees centigrade for about 60 seconds by being pulled through a resistance wound oven to form n-type regions 32 and 33 shown in Fig. 3B. Electrodes 35 and 36 are attached to n-type regions 32 and 33, respectively, and electrode 37 is attached to the p-type remainder of the body 34 by methods known in the art.

Figure 4A:
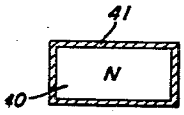
Figs. 4A to 4C show a semiconductive body at different stages in the formation of an n-p-n-p type semiconductive body in accordance with the invention.
Figure 4B:
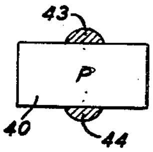
Figure 4C:
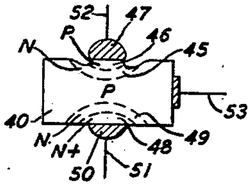

Figs. 4A to 4C shows, by way of example, a germanium body in different stages of a process for forming an n-p-n-p type germanium body suitable for a hook collector type junction transistor of the kind described in United States Patent No. 2,569,347, issued September 25, 1951, to W. Shockley.

There is first prepared an n-type germanium body 40 typically 40 mils thick and 100 mils square and having a specific resistivity of about 6 ohm centimeter. This body typically is prepared by lightly doping the melt from which the germanium crystal was grown with arsenic in the manner known to workers in the art. The surface of body 40 is contacted with a 3 percent by weight solution of $CuSO_4$ containing sulphuric acid which is electrolyzed to deposit a film of copper 41 approximately 0.01 mil thick thereon.

The body is then heated to a temperature and for a time which will result in diffusion of the copper completely through the body. In general, the temperature may be chosen from a temperature in the range between 700 degrees centigrade and 900 degrees centigrade. In this specific instance, it is advantageous to employ a temperature of 900 degrees centigrade and a heating time of 10 minutes. The n-type body 40 is thereby rendered p-type. Excess copper present on the surface of the body is removed by standard grinding and polishing operations.

A metal globule of lead 43 doped with 30 percent by weight of indium and of approximately 0.2 milligram in weight is then placed upon a surface region on p-type body 40, and fused in place at 370 degrees centigrade. About 0.2 milligram of 1 percent antimony doped gold 44 is placed on a portion of a surface opposite to the surface containing the lead globule 43. The resultant is shown in Fig. 4B. Upon heating the p-type body 40 in a resistance wound oven at approximately 850 degrees centigrade for approximately 15 seconds, an n-p-n-p type structure is formed, as shown in Fig. 4C. In particular, an n-type region 45 is formed between a regrowth indium doped p-type region 46 and the p-type body 40. A lead-indium-germanium alloy 47 remains upon the surface of the body. An $n^+$-type region 48, heavily doped with antimony, is formed by the regrowth of antimony into the body from the antimony doped gold globule 50. An n-type region 49 is formed by depletion of enough copper therefrom to render the arsenic impurities in excess. A gold-antimony-germanium alloy 50 remains adjacent $n^+$-region 48. Thereafter, electrode leads 51 and 52 are attached to gold-antimony-germanium alloy 50 and the lead-indium-germanium alloy 47, respectively, and electrode lead 53 to the p-type bulk of the body 40 by techniques known in the art. The n-p-n-p type germanium body shown in Fig. 4C is suitable for use in a junction transistor of the kind which employs a hook collector.

Any metal essentially free of copper capable of fusing with the germanium and capable of dissolving copper, such as silver or tin, could also be used in place of gold or lead in the above examples. Also, p-n-p type semiconductive bodies can be obtained by using pure acceptor metals such as indium in place of doped gold or lead.

For silicon as the semiconductive material, lithium, gold, zinc, and iron can be used as the rapidly diffusing impurity. Of these, lithium appears to have special advantages. Tin and lead are each satisfactory for use as a getter for lithium in silicon.

It has been found that elements satisfactory for use in germanium and silicon as slowly diffusing impurities generally are elements from group III or group V of the periodic table. Rapidly diffusing impurities generally are elements from other groups. For example, in germanium, copper and nickel can be used for the rapidly diffusing impurity. Arsenic, antimony, bismuth, and phosphorus can be used as the slowly diffusing impurity of opposite conductivity type. The rapidly diffusing impurities generally diffuse at a rate of at least sixteen times the rate of the fastest of the slowly diffusing impurities. The thickness of the depletion layer for any particular combination of rapidly diffusing and slowly diffusing impurities will depend on the relationship between the diffusion coefficients and the parameters of time and temperature.

By employing suitable rapidly diffusing impurities and slowly diffusing impurities, many other variations of semiconductive bodies having p-n junctions therein can be formed, in accordance with the applicant's invention. For example, transistors capable of operation at very high frequencies may be made, since the depleted region can be made very thin by proper control of the relevant parameters. Rectifiers and transistor switches can also be made by these techniques.

In addition, an n-p-i-n type semiconductive body may be readily formed. For example, a semiconductive body is first formed of intrinsic germanium which is then diffused with copper, rendering the body of p-conductivity type. A globule of tin doped with bismuth is placed on one face of the body and heated for a time to deplete copper from a region adjacent the globule, rendering this region intrinsic in nature. Immediately adjacent the tin globule, a thin n-type region is formed by regrowth of molten germanium which has become doped with bismuth from the tin-bismuth globule.

Then a copper globule doped with antimony is placed on a surface region opposite that on which the tin globule was placed. The body is then heated to a temperature required to provide there an antimony doped n-type region. As a result, an n-p-i-n type germanium body is formed.

A p-n-i-p semiconductive body likewise can be formed using the above technique with a proper choice of conductivity type determining impurities and getter metals. For example, a silicon body which is originally intrinsic has lithium diffused therein to convert it to n-type. A gallium-tin globule and a gallium-tin-lithium globule are alloyed to opposite surface regions of the body in an analogous manner.

It can readily be seen, therefore, that many variations of the applicant's methods can be devised withou departing from the spirit and scope of the invention.

What is claimed is:

1. A method for forming a rectifying junction in a crystalline semiconductive body comprising the steps of including in said body a rapidly diffusing significant impurity characteristic of one conductivity type and a relatively lower concentration of a slowly diffusing significant impurity characteristic of the opposite conductivity type, contacting with one surface of said body a layer of a metal capable of gettering the rapidly diffusing impurity from the body, and heating the body for a time and to a temperature for gettering enough of the rapidly diffusing impurity to convert a portion of the body contiguous to the said layer to the opposite conductivity type for forming a rectifying junction within said body.

2. A method for forming a p-n junction in a crystalline semi-conductive body which comprises the steps of including in said body an excess of rapidly diffusing acceptor impurities over slowly diffusing donor impurities, placing a metal having the property of being a good solvent for the rapidly diffusing acceptor impurities in contact with the body, and heating the body for a time and at a temperature sufficient to deplete a region adjacent the metal of enough of its acceptor impurities that said region becomes n-type thereby forming a p-n rectifying junction within said body.

3. A method for forming a p-n junction in a crystalline semi-conductive body which comprises the steps of including in said body having therein an excess of rapidly diffusing donor impurities over slowly diffusing acceptor impurities, placing a metal having the property of being a good solvent for the rapidly diffusing donor impurities in contact with the body, and heating the body for a time and at a temperature sufficient to deplete a region adjacent the metal of enough of its donor impurities that said region becomes p-type and a p-n rectifying junction is formed there.

4. The method of forming a plurality of rectifying junctions in a semiconductive body having therein a plurality of rectifying junctions which comprises the steps of including in said body an excess of rapidly diffusing impurity of one conductivity type over slowly diffusing impurity of the opposite conductivity type, placing in contact at given surface portions of the body a metal in which the rapidly diffusing impurity is soluble, and heating the body at a temperature and for a time sufficient to convert regions adjacent the metal to the opposite conductivity type thereby forming rectifying junctions.

5. The method of forming an n-p-n structure in a crystalline semiconductive body which comprises the steps of including in said semiconductive body an excess of rapidly diffusing acceptor impurity over slowly diffusing donor impurity, placing in contact at two spaced regions of said body a metal in which the rapidly diffusing acceptor impurity is soluble, and heating the body at a temperature and for a time sufficient to remove enough of the rapidly diffusing acceptor impurity from the regions of said body adjacent the metal to convert said regions to n-type conductivity.

6. The method for forming a p-n-p structure in a germanium body which comprises the steps of preparing an n-type germanium body in which arsenic is the predominant conductivity type determining impurity, diffusing into the body sufficient copper to convert the conductivity type of the body from n-type to p-type, placing in contact with the body a globule of gold doped with indium, and heating the assembly for a time and at a temperature to form a p-n-p structure.

7. The method for forming a p-n-p-n structure in a germanium body which comprises the steps of preparing an n-type germanium body in which arsenic is the predominant conductivity type determining impurity, depositing a film of copper on the surface of the body, heating the body to a temperature and for a time to diffuse the copper uniformly through the body thereby converting the body from n-type to p-type, removing the excess copper from the surface of said body, placing an indium doped lead globule on a portion of the surface of said body, placing an antimony doped gold globule on a second portion of the surface of said body, and heating the body for a time and at a temperature to form a p-n-p-n structure.

8. The method for forming an n-p-n-p germanium body comprising the steps of diffusing sufficient copper throughout an n-type germanium wafer to convert it to p-type, then depositing an indium doped lead coating and an antimony doped gold coating on different surface portions of the body, and then heating the body at a temperature and for a time to form an n-p-n-p structure thereof.

References Cited in the file of this patent

UNITED STATES PATENTS

| | | |
|---|---|---|
| 2,689,930 | Hall | Sept. 21, 1954 |
| 2,701,326 | Pfann et al. | Feb. 1, 1955 |
| 2,705,767 | Hall | Apr. 5, 1955 |
| 2,725,315 | Fuller | Nov. 29, 1955 |

FOREIGN PATENTS

| | | |
|---|---|---|
| 751,408 | Great Britain | June 27, 1956 |
| 1,114,367 | France | Dec. 19, 1955 |